US012789145B2

(12) United States Patent
Schwinn et al.

(10) Patent No.: US 12,789,145 B2
(45) Date of Patent: *Nov. 10, 2026

(54) POLYMERIC MEMBRANE AND METHODS FOR THE PRODUCTION OF SAME

(71) Applicant: Fresenius Medical Care Holdings, Inc., Waltham, MA (US)

(72) Inventors: Brodie Schwinn, Ogden, UT (US); Jiunn Teo, Pleasant View, UT (US)

(73) Assignee: FRESENIUS MEDICAL CARE HOLDINGS, INC., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/300,694

(22) Filed: Aug. 15, 2025

(65) Prior Publication Data

US 2025/0375739 A1 Dec. 11, 2025

Related U.S. Application Data

(63) Continuation of application No. 17/740,380, filed on May 10, 2022, now Pat. No. 12,409,420.

(Continued)

(51) Int. Cl.

*B01D 67/00* (2006.01)
*B01D 69/06* (2006.01)

(Continued)

(52) U.S. Cl.

CPC ....... *B01D 67/009* (2013.01); *B01D 67/0013* (2013.01); *B01D 67/0016* (2013.01);

(Continued)

(58) Field of Classification Search

CPC ............ B01D 67/0016; B01D 69/085; B01D 69/087; B01D 67/009; B01D 67/0095

See application file for complete search history.

(56) References Cited

U.S. PATENT DOCUMENTS 4,321,221 A 3/1982 Broutman
5,181,940 A 1/1993 Bikson et al.

(Continued)

FOREIGN PATENT DOCUMENTS

BR 102013010790 A2 7/2016
CN 101831795 A 9/2010

(Continued)

OTHER PUBLICATIONS

International Search Report and Written Opinion issued in corresponding International Patent Application No. PCT/US2022/028414 mailed Aug. 30, 2022 (14 pages).

(Continued)

*Primary Examiner* — Alison L Hindenlang
*Assistant Examiner* — Debjani Roy
(74) *Attorney, Agent, or Firm* — Kilyk & Bowersox, P.L.L.C.

(57) ABSTRACT

The present invention relates to a method to make polymeric membranes that are preferably useful in dialysis, wherein the method conducts at least one membrane-forming step and/or post-forming processing step with the use of sonication. Polymeric membrane, such as polymeric hollow fiber membrane, having improved one or properties are further described.

19 Claims, 2 Drawing Sheets

Related U.S. Application Data

(60) Provisional application No. 63/188,552, filed on May 14, 2021.

(51) Int. Cl.

| | |
|---|---|
| ***B01D 69/08*** | (2006.01) |
| ***B01D 71/62*** | (2006.01) |
| ***D01D 5/06*** | (2006.01) |

(52) U.S. Cl.

CPC ......... *B01D 67/0095* (2013.01); *B01D 69/06* (2013.01); *B01D 69/087* (2013.01); *B01D 71/62* (2013.01); *D01D 5/06* (2013.01); *B01D 2323/02* (2013.01); *B01D 2323/04* (2013.01)

(56) References Cited

U.S. PATENT DOCUMENTS

| | | | | |
|---|---|---|---|---|
| 12,409,420 | B2 * | 9/2025 | Schwinn | B01D 67/009 |
| 2004/0121120 | A1 | 6/2004 | Gray et al. | |
| 2009/0220612 | A1 | 9/2009 | Perera | |
| 2016/0030974 | A1 | 2/2016 | Kang et al. | |
| 2016/0228632 | A1 | 8/2016 | Mullick et al. | |
| 2017/0268132 | A1 | 9/2017 | Kilic et al. | |
| 2021/0189599 | A1 | 6/2021 | Zikeli et al. | |
| 2022/0362717 | A1 | 11/2022 | Schwinn et al. | |

FOREIGN PATENT DOCUMENTS

| | | | |
|---|---|---|---|
| CN | 103055711 | A | 4/2013 |
| CN | 105664739 | A | 6/2016 |
| CN | 112044289 | A | 12/2020 |
| DE | 10042119 | A1 | 3/2002 |
| EP | 3505659 | A1 | 7/2019 |
| JP | 59-1543 | A | 1/1984 |
| JP | 2-139021 | A | 5/1990 |
| JP | 3-263463 | A | 11/1991 |
| KR | 20040017045 | A | 2/2004 |
| KR | 20100079632 | A | 7/2010 |
| KR | 20150069475 | A | 6/2015 |
| WO | 2005014266 | A1 | 2/2005 |
| WO | 2020185862 | A1 | 9/2020 |

OTHER PUBLICATIONS

Tao et al., "Poly(vinylidene fluoride) membranes by an ultrasound assisted phase inversion method," Ultrasonics Sonochemistry, 2013, vol. 20, pp. 232-238.

Qu et al., "Influence of Ultrasonication Conditions on the Structure and Performance of Poly(vinylidene fluoride) Membranes Prepared by the Phase Inversion Method," Ind. Eng. Chem. Res., 2014, vol. 53, pp. 8228-8234.

Voicu et al., "The Impact of Sonication Time Through Polysulfone-Graphene Oxide Composite Films Properties," Digest Journal of Nanomaterials and Biostructures, Oct.-Dec. 2013, vol. 8, No. 4, pp. 1389-1394.

Yan et al., "Sonication-enhanced in situ assembly of organic/inorganic hybrid membranes: Evolution of nanoparticle distribution and pervaporation performance," Journal of Membrane Science, 2015, vol. 481, pp. 94-105.

* cited by examiner

POLYMERIC MEMBRANE AND METHODS FOR THE PRODUCTION OF SAME

This application is a continuation of U.S. patent application Ser. No. 17/740,380, filed May 10, 2022, which in turn claims the benefit under 35 U.S.C. § 119(e) of prior U.S. Provisional Patent Application No. 63/188,552, filed May 14, 2021, which is incorporated in its entirety by reference herein.

BACKGROUND OF THE INVENTION

The present invention relates to polymeric membranes, such as hollow fiber membranes or flat sheet membranes, which can be useful as dialysis membranes, as well as methods for manufacturing the same.

The present invention involves the use of sonication during membrane manufacturing as a way to enhance the properties of the membrane as it forms and/or to improve the rest of the membrane manufacturing process.

Non-solvent induced phase separation (NIPS) is a method used to make porous membranes. During the phase separation process, spin mass (or spin dope) is exposed to a non-solvent (precipitation fluid) that causes the dissolved polymer to demix and precipitate out to form a membrane. When a non-precipitating additive, such as polyvinylpyrrolidone (PVP), is present in the spin mass, this additive preferably gets trapped in the precipitating polymer providing a desirable property to the finished membrane that is characteristic of the additive. The rate of precipitation will also determine the porosity of the membrane. A very slow precipitation process allows time for the polymers to aggregate before they solidify. Slow precipitation can also allow time for the additive to phase out from the precipitating polymer to achieve a more thermodynamically stable state. In general, it is very hard to independently control incorporation of additive into polymer and the morphology of the membrane. It is therefore customary to add enough additive and hope that a sufficient amount of the additive remains in the membrane after the precipitation and rinsing process.

While the use of one or more additives provides benefits, as explained above, a portion of this additive can result in material build up or accumulation on one or more pieces or portions of the equipment used in methods to form the polymer membrane. This buildup can be an undesirable accumulation of material on the spinning block and/or spinning equipment other than the spinning block. Thus, there is a need to further provide methods to remove this build up without having the need to shut down the entire manufacturing operations.

Thus, there is a need to provide methods that permit improved incorporation of the components that form the membrane and/or provide methods that permit improved membrane formation during the membrane formation process and/or remove or prevent build up.

SUMMARY OF THE PRESENT INVENTION

A feature of the present invention is to provide a method to improve the formation of polymeric membrane.

A further feature of the present invention is to provide a method that provides improved mixing of the components that form the polymeric membrane.

A further feature of the present invention is to provide a method that can reduce the amount of one or more components used to form the polymeric membrane.

An additional feature of the present invention is to provide a method that reduces or avoids hollow fiber collapsing during drying of the polymeric hollow fiber membrane.

An additional feature of the present invention is to provide a method that reduces or avoids fouling or buildup of the equipment used for polymeric membrane manufacturing and down-time required for cleaning.

Additional features and advantages of the present invention will be set forth in part in the description that follows, and in part will be apparent from the description, or may be learned by practice of the present invention. The objectives and other advantages of the present invention will be realized by means of the elements and combinations particularly pointed out in the description and appended claims.

To achieve these and other advantages, and in accordance with the purposes of the present invention, as embodied and broadly described herein, the present invention relates to a method of making a polymeric membrane. The method can include the steps of providing a solution comprising at least one polymer and at least one solvent, and forming the polymeric membrane by either a) passing the solution through a spinneret (e.g., located in a spinning block) to form a polymeric hollow fiber membrane or b) casting the solution onto a surface to form a polymeric sheet membrane (e.g., a flat sheet membrane). The method further includes passing the polymeric membrane that is formed through at least one precipitation bath that includes an aqueous solution. The method then includes passing the polymeric membrane from the precipitation bath through at least one washing bath and then through at least one drying chamber, and then collecting the polymeric membrane. In the method (s) of the present invention, the method includes utilizing or applying sonication to one or more of the following steps or areas of the membrane formation process: the solution, and/or the forming step (e.g., the spinning block or spinneret, and/or the casting step), and/or the precipitation bath, and/or the washing bath, and/or the drying chamber.

The present invention, in addition, relates to a spinning block for producing polymeric membrane. The spinning block has or includes a spinneret having an external ring duct for a spin mass and a hollow core through which a precipitating solution is simultaneously fed, and at least one sonicator mounted to or on the spinning block.

The present invention further relates to a polymeric membrane made from methods of the present invention.

The present invention also relates to reducing hollow fiber collapse ("flats") utilizing the methods of the present invention.

The present invention further relates to enhanced membrane rinsing utilizing the methods of the present invention.

The present invention, in addition, relates to a reduction or elimination of accumulation of material on the membrane forming equipment utilizing the methods of the present invention.

The present invention also relates to inducing improved mixing of one or more of the membrane forming components, such as inducing microscopic level mixing/incorporation utilizing the methods of the present invention.

It is to be understood that both the foregoing general description and the following detailed description are exemplary and explanatory only and are intended to provide a further explanation of the present invention, as claimed.

The accompanying drawings, which is incorporated in and constitute a part of this application, illustrates various features of the present invention and, together with the description, serve to explain the principles of the present invention.

DETAILED DESCRIPTION OF THE PRESENT INVENTION

Figure 1:
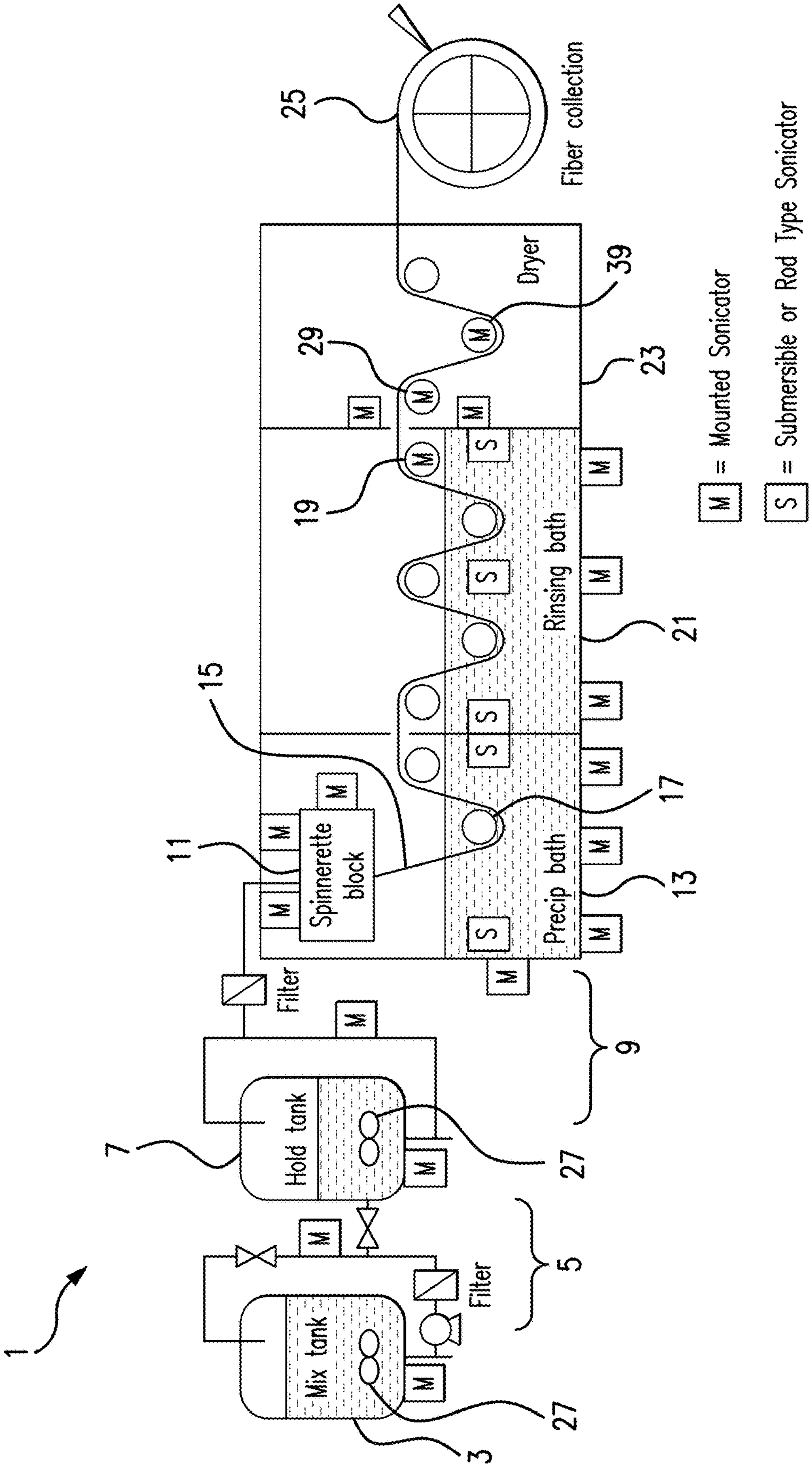
FIG. 1 is a diagram illustrating exemplary locations of the use of sonication throughout the fiber forming process.

The present invention relates to a method to make polymeric membranes that are particularly useful in dialysis, wherein the method conducts at least one membrane forming step and/or post-membrane formation processing step with the use of sonication. Polymeric membranes, such as polymeric hollow fiber membranes, resulting from one or more methods of the present invention are further described and are a part of the present invention. The polymeric membranes can have one or more properties that are improved from the methods of the present invention. The polymeric membranes can be used in various processes that utilize polymeric membranes, such as, but not limited to, dialysis and/or other liquid filtrations. Novel spinning block designs that implement aspects of the present invention are further described.

The present invention, in part, relates to a method of making a polymeric membrane, where the method can comprise, consist essentially of, consist of, include or involve forming the polymeric membrane from a non-solvent induced phase separation process wherein sonication (e.g., in one or more locations) is utilized during the forming and/or the processing steps.

The sonication can encompass 100% of the membrane forming process (e.g., the entire production line) or can encompass less than 100% of the membrane forming process (such as, from 1% to 99%, from 10% to 95%, from 20% to 90%, from 30% to 90%, from 40% to 90%, from 50% to 90% from 60% to 90%) and the % is a reference to the percent of time that sonication is used from the solution leaving the mixing tank to the formed membrane leaving the last drying station just prior to being collected.

With respect to one method of making the polymeric membrane of the present invention, the method can comprise, consist essentially of, consist of, include or involve:

a. providing a solution comprising at least one polymer and at least one solvent;
b. forming the polymeric membrane (e.g., either in a spinning block, by passing the solution through a spinneret to form a polymeric hollow fiber membrane, or by casting the solution onto a surface to form a polymeric sheet membrane (e.g., flat sheet membrane));
c. passing the polymeric membrane from step b) through at least one precipitation bath comprising an aqueous solution;
d. passing the polymeric membrane from step c) through at least one washing bath;
e. passing the polymeric membrane from step d) through at least one drying chamber; and
f. collecting the polymeric membrane from step e), wherein one or more of the i) solution, ii) forming step (e.g., the spinning block or casting), iii) precipitation bath, iv) washing bath, v) drying chamber, and/or vi) location(s) before and/or after one of the spinning block or casting step and/or one of the baths, utilizes sonication.

When a hollow polymeric fiber membrane is made in the spinning block, the method can involve or include the step of passing the solution along with passing a precipitation fluid through the spinning block (e.g., spinneret) to form the polymeric hollow fiber membrane.

The method of making the polymeric membrane can comprise, consist essentially of, consist of, include or involve:

a. heating i) a solution including or comprising at least one hydrophobic polymer and at least one hydrophilic polymer in a solvent including or comprising at least one polar aprotic solvent and ii) a precipitation fluid including or comprising at least one polar aprotic solvent, water, or both;
b. forming the polymeric membrane (e.g., either in a spinning block, by passing the solution through a spinneret to form a polymeric hollow fiber membrane or by casting the solution onto a surface to form a polymeric sheet membrane (e.g., flat sheet membrane));
c. passing the polymeric membrane from step b) through at least one air chamber or gap;
d. passing the polymeric membrane from step c) through at least one precipitation bath including or comprising an aqueous solution in a precipitation bath chamber;
e. passing the polymeric membrane from step d) through at least one washing bath within a washing chamber;
f. passing the polymeric membrane from step e) through at least one drying chamber; and collecting the polymeric membrane from step f), wherein one or more of the i) solution, ii) forming step (e.g., the spinning block or spinneret or casting), iii) precipitation bath, iv) washing bath, v) drying chamber, and/or vi) location(s) before and/or after one of the spinning block (spinneret) or casting, and/or one of the baths, utilizes sonication.

For purposes of the present invention, the step of passing through an air chamber or utilizing an air gap between any of the steps is completely optional. Put another way, this step can be skipped if desired. An air gap can be utilized before the precipitation bath and/or before the washing bath.

Also, it is to be understood that for purposes of the present invention, one or more optional processing steps can occur prior to, in between, and/or after any one or more of the recited steps described herein.

As an option, the step of passing through an air chamber or air gap can be utilized after any one step (e.g., referring to the step lettering above, optionally after any one or more of steps b, d, e, and/or f). As an option, more than one step of passing through an air chamber or an air gap can be utilized (i.e., more than one air gap can exist in the process).

With regard to the heating step, the solution and/or the precipitation fluid (if used) can be heated to any desired temperature below the boiling point of the solution and precipitation fluid. Examples of suitable heating temperatures include, but are not limited to, from about 20° C. to about 90° C. The reference to temperature is the actual temperature of the solution and/or precipitation fluid. The solution and precipitation fluid can be heated such that they each have the same temperature or about the same temperature (e.g., within 10° C. of each other or within 5° C. of each other or within 1° C. of each other). Any suitable device can be used to heat the solution and precipitation fluid such as, but not limited to, a heater.

For purposes of the present invention, the precipitation fluid can be considered the bore fluid or center fluid. For purposes of the present application, the solution comprising the polymer and the solvent (such as the hydrophobic polymer, hydrophilic polymer and solvent) can be considered the spin mass or casting solution.

Further details of each of the steps of the method of making the polymeric membrane are provided herein. But, first, some aspects of the sonication and the utilization of the sonication in the present invention are described.

The sonication utilized in the present invention can be in one location or in multiple locations in any of the methods of the present invention.

The sonication can comprise, consist essentially of, consist of, include or involve sonicating the solution prior to the solution entering the spinning block. The solution, as detailed herein, includes at least one polymer dissolved or dispersed in at least one solvent. In processes to make the polymeric membrane, the solution can be prepared in a mixing tank(s) and then optionally transferred to a holding tank by way of transfer flow lines or feed lines that can comprise or include piping and one or more valves. The mixing tank and/or holding tank can include mixing devices, such as stirrers, agitators, and/or impellers and the like. From the mixing tank and/or holding tank (if present), the solution is transferred or fed or pumped either to the spinning block (to form a hollow membrane) or to the casting station (to form a sheet). In one option, the sonicator or more than one sonicator can be located at the mixing tank to sonicate the solution in the mixing tank. In one option, the sonicator or more than one sonicator can be located at the holding tank to sonicate the solution in the holding tank. In one option, the sonicator or more than one sonicator can be located at one or more flow lines or feed lines i) between the mixing tank and holding tank (if present) and/or ii) between the holding tank and the spinning block (or casting station) and/or iii) between the mixing tank and spinning block (or casting station). The sonicator can be a mounted sonicator that is mounted onto the tank and/or flow lines. With this option, one sonicator can be present or multiple sonicators can be present. In a more preferred option, a sonicator is located at each of the mixing tank, the holding tank, and at least one sonicator is located on the feed lines between the mixing tank and holding tank, and at least one sonicator is located on the feed lines between the holding tank and the spinning block (or casting station).

The sonicator can be mounted on the exterior of the equipment including tank and/or line and/or other component of the membrane forming system or apparatus. With a mounted sonicator, the sonicator is mounted on the exterior of the equipment such that it is touching or in contact with the exterior of the equipment and thus not in physical contact with the material being processed within that equipment. The sonicator can be a submersible unit that is inserted into the interior of the tank or pipe or other equipment and thus in physical contact with the material being processed within that equipment. The submersible sonicator units are typically sealed enclosures fitted with sonicator(s) inside. In addition, or in the alternative, the submersible sonicator unit can encompass sonicators which utilize sonication rods or probes, where at least the rod or probe of the sonicator is inserted or located within the interior of the equipment and thus in contact with the material within the equipment. Thus, the rod or probe can be inserted through an opening on the equipment, tank, pipe, or device. For purposes of the present invention, a mounted sonicator refers to a sonicator that is mounted on the exterior of the equipment and a submersible sonicator refers to a sonicator or the rod/probe thereof inserted into the equipment. Further details of the sonicator are provided herein.

The sonication can comprise, consist essentially of, consist of, include or involve sonicating the solution while in the spinning block, when used. The spinning block, as further described herein, can comprise or include a spinneret. In this option, the sonicator or more than one sonicator can be located at the spinning block (e.g., mounted on the spinning block). For instance, one or two or three or more sonicators can be mounted at various locations on the spinning block so as to ensure that the solution passing through the spinning block and/or the fiber formed in the spinning block is sonicated.

Thus, another aspect of the present invention includes a spinning block for producing a polymeric hollow fiber membrane, the spinning block comprising at least one spinneret(s). Each of the at least one spinnerets can include or comprise an external ring duct for a spin mass and a hollow core through which a precipitating solution (bore fluid) is simultaneously fed, and at least one sonicator mounted on the spinning block such as on the spinneret and/or ring duct. The spinning block can have more than one spinneret, such as two, three, four, five, six, or more spinnerets as part of the same spinning block. As an option, there can be more than one spinning block. The spinning block can have one, or two or three or four (or more than four) mounted sonicators as described herein.

Figure 2:
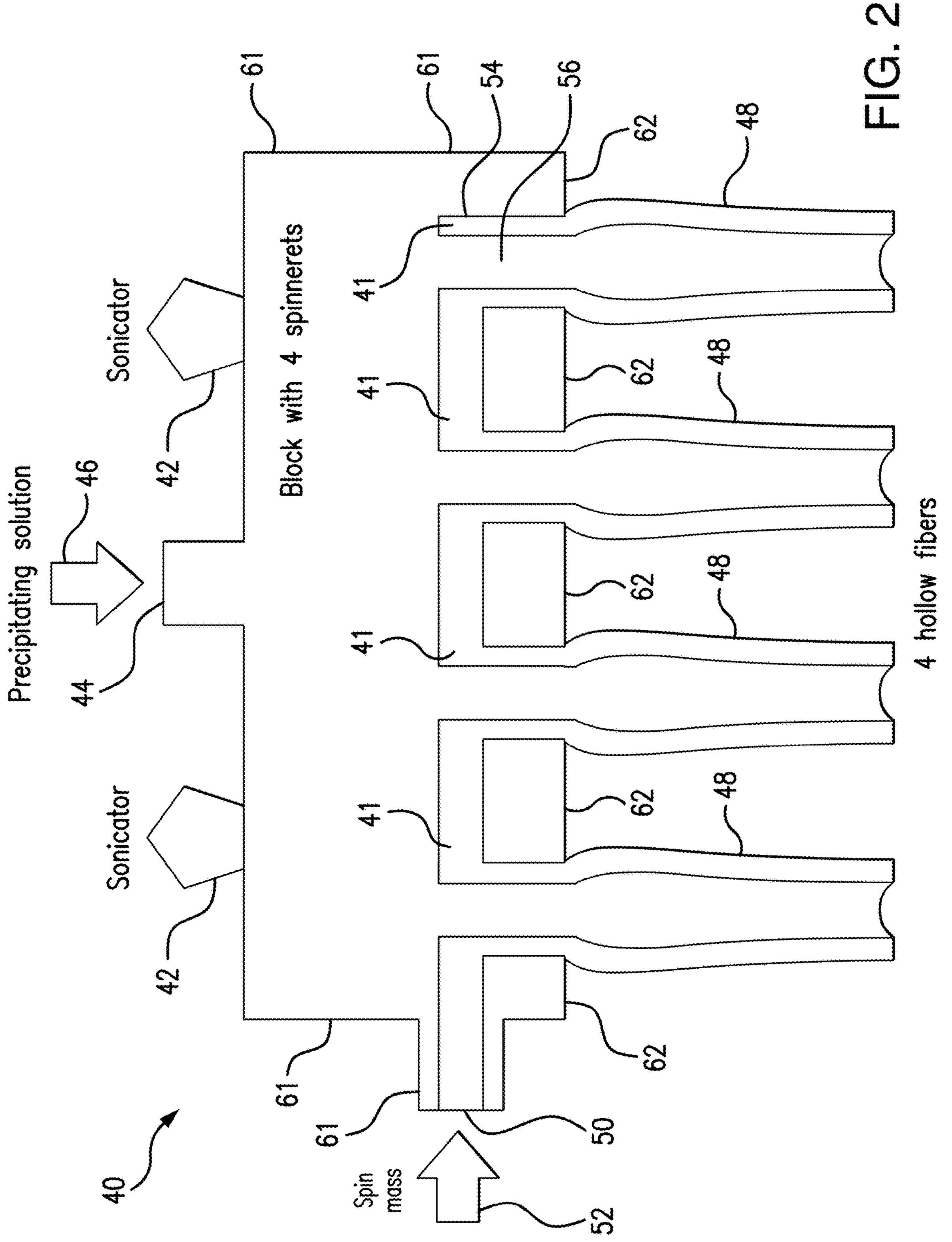
FIG. 2 is a diagram showing an exemplary spinning block with multiple spinnerets and at least one sonicator.

As an example, FIG. 2 shows a schematic (not to size) of a spinning block (40) having four spinnerets (41). In this example, two mounted sonicators (42) are located at the upper portion or top of the spinning block (40). While two sonicators are shown, it is to be understood that more than two sonicators can be used. Further, in lieu of or in addition to the sonicator locations shown, one or more sonicators (42) can be located at one or more sides of the spinning block (40) at one or more locations (61). Also, in lieu of or in addition to the sonicator locations shown, one or more sonicators can be located between the spinnerets, for instance at one or more of the locations (62). Each of the spinnerets (41) has a ring duct (54) for the spin mass (52) and a hollow core (56) through which a precipitating solution or bore fluid (46) pass, which are simultaneously fed by way of precipitating solution feed inlet (44) for the precipitating solution (46) and spin mass feed inlet (50) for the spin mass (52). The spin mass (52) and the precipitating solution (46) exit the spinneret(s) (41) as wet fibers (48) with the precipitating solution in the core.

For sheet membrane formation, a casting station is utilized. The casting station can comprise, consist essentially of, consist of, include or involve a casting knife/blade that is used to spread the solution that is cast onto a surface (e.g., a flat surface or belt) by a metering device and then submerging the casted sheet into the precipitation bath solution. One or more sonicators can be utilized on one or more parts of the casting station and/or casting surface.

The sonication can comprise, consist essentially of, consist of, include or involve sonicating the precipitation bath. The precipitation bath is further described herein. In this option, the sonicator or more than one sonicator can be located at, located on, and/or located within the precipitation bath. For instance, one or two or three or more sonicators can be mounted at various locations at or on the precipitation bath (e.g., mounted sonicator(s)) so as to ensure that the membrane passing through the precipitation bath is sonicated. In the alternative, or in addition, one or two or three or more sonicators can be located within the precipitation bath (e.g., submerged in the precipitation bath as submersible type sonicators and/or probe or rod type sonicators). In such baths, one or more guides and/or rollers are used to direct the membrane through the bath and eventually out of the bath. As an option, one or more of these guides or rollers can include a sonicator mounted on the guide or roller (e.g., attached to the guide or roller and/or mounted within or inside of the roller). One or more of the guides or rollers may be submerged in the bath. One or more of the guides or rollers may be un-submerged in the bath (e.g., the guides or rollers are located above the bath but within that bath area). Either or both of these guides and/or rollers may include the sonicator. When more than one sonicator is used, the sonicators are preferably located in different locations and/or preferably located so that the membrane can optionally be sonicated the entire residence time or almost the entire residence time spent in the precipitation bath (e.g., at least 75%, at least 80%, at least 85%, at least 95%, at least 97%, or least 99%, or at least 99.5% or 100% of entire residence time for this stage, the membrane is sonicated via the sonicating of the bath). Preferably, both mounted and submerged sonicators are used together.

The sonication can comprise, consists essentially of, consists of, include or involve sonicating the rinsing bath which is also known as the washing bath. The washing bath is further described herein. In this option, the sonicator or more than one sonicator can be located at, located on, and/or located within the washing bath. For instance, one or two or three or more sonicators can be mounted at various locations at or on the washing bath (e.g., mounted sonicator(s)) so as to ensure that the membrane passing through the washing bath is sonicated. In the alternative, or in addition, one or two or three or more sonicators can be located within the washing bath (e.g., submerged in the washing bath as submersible type sonicators and/or probe or rod type sonicators). In such baths, one or more guides and/or rollers are used to direct the membrane through the bath and eventually out of the bath. As an option, one or more of these guides or rollers can include a sonicator mounted on the guide or roller (e.g., attached to the guide or roller and/or mounted within or inside of the roller). One or more of the guides or rollers may be submerged in the bath. One or more of the guides or rollers may be un-submerged in the bath (e.g., the guides or rollers are located above the bath but within that bath area). Either or both of these guides and/or rollers may include the sonicator. When more than one sonicator is used, the sonicators are preferably located in different locations and/or preferably located so that the membrane can optionally be sonicated the entire residence time or almost the entire residence time spent in the washing bath (e.g., at least 75%, at least 80%, at least 85%, at least 95%, at least 97%, or least 99%, or at least 99.5% or 100% of entire residence time for this stage, the membrane is sonicated via the sonicating of the bath). Preferably, both mounted and submerged sonicators are used together.

The sonication can comprise, consists essentially of, consists of, include or involve sonicating in the drying chamber, or in between the washing bath and the drying chamber or both. The drying chamber is further described herein. In this option, the sonicator or more than one sonicator can be located at, located on, and/or located within the drying chamber. For instance, one or two or three or more sonicators can be mounted at various locations at or on the drying chamber (e.g., mounted sonicator(s)) so as to ensure that the membrane passing through the drying chamber is sonicated. A portion, as an option, of the one or two or three or more sonicators can be located within the drying chamber (e.g., attached or mounted to an inner wall). In such drying chambers, one or more guides and/or rollers are used to direct the membrane through the drying chamber and eventually to the next stage, which can be the membrane collection stage. As an option, one or more of these guides or rollers can include a sonicator mounted on the guide or roller (e.g., attached to the guide or roller and/or mounted within or inside of the roller). When more than one sonicator is used, the sonicators are preferably located in different locations and/or preferably located so that the membrane is sonicated right before entering the drying chamber or early in the drying chamber (e.g., the sonicating of the membrane upon exiting the washing bath occurs immediately upon exiting the washing bath or occurs within 2 seconds of exiting the liquid surface of the washing bath). The residence time that sonication is used while the fiber is present in the drying chamber can be the entire residence time or almost the entire residence time spent in the drying chamber or a portion of the residence time spent in the drying chamber (e.g., from 1% to 100% of the residence time, from 1% to 75%, from 1% to 60%, from 1% to 50%, from 10% to 75%, from 15% to 75%, from 20% to 75%, from 30% to 75%, from 40% to 75%, from 40% to 60%, at least 5%, at least 10%, at least 15%, at least 20%, at least 25%, at least 30%, at least 40%, at least 50%, at least 60%, at least 75%, at least 80%, at least 85%, at least 95%, at least 97%, or least 99%, or at least 99.5% or 100% of entire residence time for this stage, the fiber is sonicated via the sonicating in the drying chamber). Preferably, when sonication is less than 100% of the residence time in the drying chamber, the sonication occurs at least in the first (initial) part of the drying chamber, such that sonication occurs in the first section or region of the drying chamber, where the fiber first enters the drying chamber. Put another way, the initial or first 1% to 50% (5% to 50% or 10% to 50% or 20% to 50%) of the residence time that the fiber is in the drying chamber can receive the sonication, whereas the last 1% to 50% (5% to 50% or 10% to 50% or 20% to 50%) of the residence time does not receive sonication. For instance, if the entire residence time spent in the drying chamber is 30 seconds (residence time of 100%), preferably, sonication occurs within the first 15 seconds.

The sonicators used in the present invention are commercially available, such as from Beijing Ultrasonic. Particular examples include the 300 W Immersible Ultrasonic Transducer and similar models.

In general, with respect to the sonication, any one or more of the sonications can be conducted at an oscillation frequency of at least 20 kHz, such as from 20 kHz to 50 MHz.

The individual sonicator can have a power rating of at least 25 watts, or at least 50 watts, or at least 100 watts, or at least 150 watts, or at least 200 watts, such as from 25 watts to 1500 watts, or from 100 watts to 1500 watts, or from 200 watts to 1000 watts or from 400 watts to 800 watts and the like.

The sonication used can be a swept-frequency mode of sonication. This mode is where the frequency is changed at a certain rate (e.g., one frequency for a period of time, and then a second frequency for a period of time, and then a third frequency for a period of time).

The sonication can be conducted with an ultrasonic apparatus. Examples include a tip sonicator or probe sonicator. Other examples include a bath sonicator.

As an option, the sonication can be a pulsed mode of sonication. As an option, the sonication can be a continuous mode of sonication (i.e., continuous sonication).

When the sonication occurs in a bath of liquid, the liquid can be circulated as an option, or the liquid can be non-circulated.

The sonication, depending on where the sonication occurs and/or how the sonicator is used or located, can be direct sonication or can be indirect sonication.

The sonication can be conducted with an ultrasonic homogenizer or probe sonicator.

When a bath is the location for the sonication, the bath has a volume of liquid, and the sonication can, as an option, occur at a power rating of sonication per gallon of liquid in the bath so as to achieve a rating of at least 0.1 watt/gallon or at least 0.2 watt/gallon (e.g., at least 0.3 watt/gallon, at least 0.4 watt/gallon, at least 0.5 watt/gallon, at least 0.6 watt/gallon, or at least 0.8 watt/gallon, such as from 0.1 watt/gallon to 1 watt/gallon or from 0.2 watt/gallon to 1 watt/gallon).

With respect to further details of the methods of the present invention and the steps involved, as indicated, generally, the solution containing the polymer is dissolved in the solvent.

For example, the solution can contain at least one polymer and at least one solvent.

As a more specific example, the solution can contain at least one hydrophobic polymer and at least one hydrophilic polymer dissolved in the solvent which can be or comprise at least one polar aprotic solvent.

The solution can contain a component that can contribute or result in fouling or buildup of the equipment utilized in the methods of the present invention. This component can be considered an additive that causes fouling or buildup or results in undesirable accumulation of material on the spinning block and/or spinning equipment other than the spinning block. The additive can be the polymer or one of the polymers that form part of the solution, or can be an additive that is a component other than the polymer or one of the polymers that form part of the solution.

With regard to the hydrophobic polymer, examples include, but are not limited to, poly(aryl)ethersulfone (PAES), polysulfone (PSF), cellulose triacetate (CT), or polyethersulfone (PES), or any combinations of these polymers. More specific examples of these polymers are described below.

With regard to the hydrophilic polymer, the hydrophilic polymer can be one or more types of polyvinylpyrrolidone (PVP), polyethylene glycol (PEG), polyvinyl alcohol (PVA), a copolymer of polypropylene oxide and polyethylene oxide (PPO-PEO), or any combinations thereof.

The solvent as stated comprises at least one polar aprotic solvent. More than one polar aprotic solvent can be present. The solvent can contain 90% to 100% by weight of the polar aprotic solvent(s). Examples of the polar aprotic solvent include, but are not limited to, dimethylacetamide (DMAC) or N-methyl-2-pyrrolidone (NMP), dimethylsulfoxide (DMSO), diphenylsulfone (DFS), or any combinations thereof. Other suitable solvents can be used.

As an example, generally the solution that contains the hydrophobic polymer and hydrophilic polymer and solvent can contain, for instance, from about 10 wt % to about 30 wt % of the hydrophobic polymer such as from about 10 wt % to about 25 wt % or from about 10 wt % to about 20 wt % or from about 15 wt % to about 20 wt % based on the total weight of the solution.

The hydrophilic polymer can be present in the solution in an amount of from about 2 wt % to about 30 wt % or from about 3 wt % to about 8 wt % or from about 4 wt % to about 8 wt % or other amounts based on the total weight of the solution. In some embodiments, the hydrophilic polymer may be present in the solution in an amount below 2 wt %, such as about 1 wt %, about 0.5 wt %, or even less than 0.5 wt % or 0 wt %. In some embodiments, the hydrophilic polymer may be present in the solution in an amount greater than 10 wt %, such as about 11 wt %, about 12 wt %, or even greater than 12 wt %.

With regard to the solvent, the solvent can be present in an amount of from about 60 wt % to about 90 wt %, such as from about 70 wt % to about 90 wt %, or other amounts based on the total weight of the solution.

Additional components may be present in the solution or spin mass. These components can be considered one or more additives that can cause the above-mentioned build up or accumulation on equipment. The additional additive(s) can be one or more of the following: a crystal nucleation agent, a surface modifying macromolecule or surface modifying composition, an anti-oxidant (e.g., vitamin E), surface active molecules, a cross-linker(s), ligands carrying macromolecules or polymer, a charged polymer, a compatibilizer, a salt, a polyvinylpyrrolidone (PVP), or glycerol or any combinations thereof.

The amount of the one or more additional additives can be from about 0.01 wt % to about 50 wt % (e.g., 1 wt % to 50 wt %, 5 wt % to 50 wt %, 10 wt % to 50 wt %, 25 wt % to 50 wt, 1 wt % to 10 wt %, 1 wt % to 20 wt %), based on the total weight of the polymeric fiber membrane. The polymeric fiber membrane can contain any one or more of these additives (such as any two, any three, any four, any five or more, or all of them).

The methods of the present invention can be more effective when an additive is present in the solution since the methods of the present invention can reduce, prevent, control, and/or remove fouling or buildup or undesirable accumulation of material (e.g., an additive or portion thereof from the solution) on the spinning block and/or spinning equipment other than said spinning block.

With respect to the surface modifying macromolecule, examples include, but are not limited to, one or more surfactants, Zwitterionic compound(s), fluorinated polyurethane, and the like. A more preferred amount to use with respect to the surface modifying macromolecule is from about 1 wt % to 25 wt %, based on the total weight of the water permeable porous hollow fiber membrane. The use of a surface modifying macromolecule can aid or contribute to the ability of the formation of pores during a stretching process, for instance. A surface modifying macromolecule can be considered a surface active molecule. As used herein, "surface modifying" can refer to a composition or material that comprises a "surface modifier" compound, such as surface modifying macromolecules (SMMs), described herein or in U.S. Pat. Nos. 6,127,507, 8,071,683, 9,617,421, and 8,318,867, all of which are incorporated in their entireties by reference herein. A surface modifier can also be described as a polymer or oligomer backbone covalently attached to at least one surface active group. A "surface active group" refers to a lipophilic group covalently tethered to a surface modifier.

With respect to the precipitation fluid or bore fluid, if used, this fluid can contain from 0 wt % to 100 wt % aqueous solvent (based on total weight of the precipitation fluid) such as water (e.g., from about 10 wt % to about 100 wt %). The precipitation fluid can contain an organic solvent or a polar aprotic solvent such as, but not limited to, DMAC, an NMP alcohol, or other polar organic. The organic solvent or polar aprotic solvent can be present in an amount of from about 0 wt % to about 100 wt %, such as from about 10 wt % to about 90 wt % based on the total weight of the precipitation fluid. A more specific example is where the precipitation fluid contains from about 30 wt % to about 70 wt % aqueous solvent such as water and from about 70 wt % to about 30 wt % of an organic solvent such as a polar aprotic solvent. As indicated, the precipitation fluid can contain an aqueous solvent with no polar aprotic solvent present or the precipitation fluid can contain at least one polar aprotic solvent with no water present.

With regard to the step of passing the solution and precipitation fluid through a spinneret, this step can also be considered guiding the solution and precipitation fluid through a spinning block or spinneret, which forms the polymeric fiber membrane. This process generally involves what could be considered a precipitation process or phase inversion process. Further details of the spinning process using a spinneret are described in more detail below.

Upon exiting the spinneret (or in the option of casting), the formed polymeric fiber or polymeric fiber membrane may pass through or be guided into an air chamber which can also be considered an air gap. For purposes of the present invention, this air chamber can be a self-enclosed chamber or structure (or partially self-enclosed chamber) which has an entrance for the fiber or membrane to enter and an exit for the fiber or membrane to exit but otherwise, as an option, can be self-enclosed in order to optionally control the atmosphere within the air chamber, and optionally, the temperature within the air chamber. For instance, the temperature of this air chamber can be from about 30° C. to 60° C. or other temperatures within or outside this range. This air chamber or air gap can also be considered by one of skill in the art to be the spinning shaft area. Generally, the size or distance between the exit point of the spinneret or slit opening (or the casting station or knife) and the subsequent precipitation bath can be, for instance, from about 0 mm to about 1500 mm, such as from about 200 mm to about 1000 mm, or from about 400 mm to about 800 mm, or from about 400 to about 1000 mm, and this distance or gap can be totally within the air chamber if a self-enclosed chamber is used. As an example, the time that the polymeric membrane spends in the air chamber can be on the order of from about 1 second to about 240 seconds. As an option, the air chamber can have controlled humidity which can range from a relative humidity of 20% to over 99%.

In the next step (whether after utilizing a spinning block or casting step), the polymeric fiber or membrane exiting the optional air chamber then enters a precipitation bath or precipitation bath area. The precipitation bath comprises, consists essentially of, consists of, includes, or is an aqueous solution. This precipitation bath can be located in a precipitation bath chamber. The precipitation bath chamber can, in a similar manner as the air chamber, be optionally a self-enclosed area (or partially self-enclosed chamber) that has an entry point and an exit point for the polymeric membrane. The atmosphere within the precipitation bath chamber, meaning the air pocket or air space above the liquid precipitation bath, can be controlled with regard to relative gas concentrations (i.e., as measured by percentages or partial pressures). For purposes of the present invention, the precipitation bath can be entirely an aqueous solution such as water, although the precipitation is normally equilibrated with the organic solvent washed out from the membrane or fiber. As an option, other components can be included in the aqueous bath such as one or more water-dispersible solvents or additives such as, but not limited to, one or more types of alcohols or polar aprotic solvents. As an option, the temperature of the precipitation bath can be controlled for instance to about 10° C. to 80° C. or from about 15° C. to 25° C., or from about 60° to 70° C., or other temperatures. Generally, the precipitation bath or precipitation bath chamber can be of a size of from about 10 mm to about 1000 mm in length. As an option, the time that the polymeric membrane is submerged (residence time) in the precipitation bath in the precipitation bath chamber can be on the order of from about 0.1 second to about 30 seconds.

Upon exiting the precipitation bath chamber, the polymeric membrane is guided to or passes into a washing bath (also referred to as a rinsing bath) or multiple washing baths, which can be referred to as the washing chamber. The washing chamber can comprise, consist essentially of, consist of, or include one or more washing bath areas. As in the case of any of the post-membrane processing stations or chambers, the washing chamber can be a self-enclosed atmospherically-controlled area (or partially self-enclosed chamber) with an entry point and an exit point for the polymeric membrane. The washing bath generally comprises, consists essentially of, consists of, includes, or is an aqueous solution such as water. The washing bath can be one bath, two baths, three baths, or more. The atmosphere within the washing chamber, meaning the air pocket or air space above the liquid bath, can also be controlled. If more than one bath is used, each bath can be separately controlled with respect to atmosphere and/or the bath contents and/or size can be the same or different. Generally, the washing bath is 98 wt % to 100 wt % water (based on total weight of the washing bath). The washing bath or each washing bath can have a size of from about 10 mm to about 10,000 mm or longer with regard to length. The total fiber length immersed in washing bath(s) may be greater than 20,000 mm, such as from about 50,000 mm to about 100,000 mm. The total residence time of the polymeric membrane in one or more washing baths can be from about 0.1 second to about 30 seconds, or from about 2 minutes to about 15 minutes, or from about 5 minutes to about 10 minutes. The temperature of the washing bath or washing chamber can be optionally controlled for instance to have a temperature of from about 10° C. to about 50° C., or from about 20° C. to about 35° C.

After exiting the washing chamber, the polymeric membrane can then be passed into or guided into at least one drying chamber. As in the case with the other chambers, the drying chamber can be a self-enclosed area (or partially self-enclosed chamber) that can be atmospherically controlled independently of the other chambers and that has an entry point and an exit point for the polymeric membrane. The temperature of the drying chamber can be, for instance, 80° C. or higher, above 80° C., above 90° C., above 100° C., above 110° C., 120° C. or higher, above 120° C., above 130° C., above 140° C., above 150° C., above 160° C., above 170° C., above 180° C., such as from about 80° C. to 220° C., from 90° C. to 220° C., from 120° C. to 220° C., from about 130° C. to 200° C., from about 140° C. to 200° C., from about 185° C. to 220° C., from about 150° C. to about 220° C., or from about 170° C. to about 200° C. or other temperatures. The residence time in the drying chamber, whether one drying chamber or multiple drying chambers, can be from about 0.5 second to about 1000 seconds. The size of the drying chamber(s) can be from about 100 mm to about 10,000 mm in length or longer. The total fiber length immersed in drying chamber(s) may be greater than 20,000 mm, such as from about 50,000 mm to about 100,000 mm. If more than one drying station or chamber is used, the chamber/station temperature used for drying can be the same or different for each chamber/station.

During the drying step, and/or during the act of drying of the polymeric membrane, the surface temperature of the polymeric fiber can be 80° C. or higher, above 80° C., above 90° C., above 100° C., above 110° C., 120° C. or above, above 120° C., above 130° C., above 140° C., above 150° C., above 160° C., above 170° C., or even above 180° C., such from about 80° C. to 220° C., 90° C. to 220° C., or from about 120° C. to about 220° C., or from about 130° C. to about 220° C., or from about 140° C. to about 200° C., or from about 150° C. to about 190° C. or other temperatures.

As an option, the step of drying can be accomplished in the absence of irradiating of the polymeric fiber membrane with microwaves, either high output (26 kW to 100 kW or more) or low output (e.g., 25 kW or less). Thus, as an option, no irradiation type driers (e.g., no microwave-irradiation type driers) are utilized during the drying step.

As an option, the step of drying can be accomplished in the absence of reduced pressure. Thus, as an option, no reduced pressure atmosphere or zone (e.g., 0.1 kPa to 22 kPa) is utilized during the drying step.

After exiting the drying chamber, the polymeric membrane, now dry or substantially dry, can be collected. The collecting of the polymeric membrane can be done in any manner in which membrane or fibers are typically collected, such as, but not limited to, using a bobbin or spool. The membrane or fibers may be crimped before they are collected.

In alternative embodiments, the formed polymeric fiber or polymeric membrane may pass directly from the spinneret or the casting station (or casting surface) into the precipitation bath (i.e., the size or distance between the exit point of the spinneret or slit opening or casting station or knife, and the subsequent precipitation bath can be about 0 mm), in which case one or more optional air chambers may follow the precipitation bath.

Accordingly, in some embodiments, a method of making a polymeric membrane comprises, consists essentially of, consists of, includes or involves:

a. heating i) the solution and ii) the precipitation fluid;
b. passing the solution and the precipitation fluid through a spinneret to form a polymeric membrane;
c. passing the polymeric membrane from step (b) through at least one precipitation bath including or comprising an aqueous solution in a precipitation bath chamber;
d. passing the polymeric membrane from step (c) through at least one washing bath within a washing chamber;
e. passing the polymeric membrane from step (d) through at least one air chamber;
f. passing the polymeric membrane from step (e) through at least one drying chamber; and
g. collecting the polymeric membrane from step (f), wherein one or more of the i) solution, ii) the spinning block, iii) the precipitation bath, iv) the washing bath, v) the drying chamber, and/or vi) a location(s) before and/or after one of the spinning block and/or one of the baths, utilizes sonication as described herein.

Similarly, depending on the position of the air chamber(s) in the process, in some embodiments, a method of making a polymeric membrane comprises, consists essentially of, consists of, includes or involves:

a. heating i) the solution and ii) the precipitation fluid;
b. passing the solution and the precipitation fluid through a spinneret to form a polymeric membrane;
c. passing the polymeric membrane from step b through at least one precipitation bath including or comprising an aqueous solution in a precipitation bath chamber;
d. passing the polymeric membrane from step c through at least one air chamber;
e. passing the polymeric membrane from step d through at least one washing bath within a washing chamber;
f. passing the polymeric membrane from step e through at least one drying chamber; and
g. collecting the polymeric membrane from step f, wherein one or more of the i) solution, ii) the spinning block, iii) the precipitation bath, iv) the washing bath, v) the drying chamber, and/or vi) a location(s) before and/or after one of the spinning block and/or one of the baths, utilizes sonication as described herein.

In any of the methods to form the polymeric membrane of the present invention, as an option, the forming of the polymeric membrane can be done in the absence of a cross-linking treatment step. In other words, as an option, there is no thermal cross-linking step, no chemical cross-linking step, and/or no cross-linking by irradiation. As an option, the degree of cross-linking of the polymeric fiber membrane is a low degree of cross-linking (DC) or low crosslink density, for example less than 10%, preferably less than 1%, more preferably less than 0.1%.

With reference to FIG. 1, a diagram is shown that provides non-limited examples of utilizing sonication during the membrane forming process. In the diagram, the solution is formed and/or mixed together in the mixing tank 3. The solution is transferred or pumped via feed lines 5. The feed lines 5 can transfer or pump the solution to a holding tank 7. As shown in FIG. 1, each of the mixing tank 3 and holding tank 7 has an agitator device 27 such as an impeller within the tanks. As shown through FIG. 1, the symbol M denotes a mounted sonicator and the symbol S denotes a submersible or rod type sonicator. The locations and number of sonicators shown are exemplary only and additional sonicators can be used or fewer. As further shown in FIG. 1, the solution in the holding tank 7 is transferred via feed lines 9 to the spinning block or spinneret block 11 (in lieu of the spinning block 11, a casting station with a casting surface can be utilized). The membrane or fiber 15 is formed and exits the spinning block 11 (or casting station) and there is a momentary (optional) air gap between the exit point of the spinning block 11 (or casting station) and the liquid surface of the precipitation bath 13. Guides or rollers 17 are located throughout the baths and dryer chamber 23. One or more of the guides or rollers can have a mounted sonicator 19 as an option. The membrane or fiber 15 exits the precipitation bath 13 and again an optional air gap can exist between the precipitation bath 13 and the washing bath (or rinsing bath) 21. The membrane or fiber enters the washing bath 21. Upon exiting the washing bath 21, the membrane or fiber 15 enters the drying chamber 23. As shown in FIG. 1, upon immediately or almost immediately exiting the washing bath 21, the membrane or fiber 15 is subjected to sonication via guide or roller 19, which continue with roller 29 and roller 39. The membrane or fiber 15, now dry, exits the drying chamber and is collected by a membrane or fiber collecting device 25.

The polymeric membrane that is formed by the methods of the present invention can be a polymeric hollow fiber membrane.

The polymeric membrane that is formed by the methods of the present invention can be a polymeric sheet membrane or polymeric flat sheet membrane.

In the methods of the present invention, the polymeric membrane formed from the method can have a molecular weight cut-off (MWCO) of from about 40 kDa to about 120 kDa such as from about 40 kDa to about 90 kDa or from about 50 kDa to about 80 kDa. This MWCO is a value for describing the retention capabilities of the membrane and refers to the molecular mass of a solute where the membrane has a rejection of 90%, corresponding to a sieving coefficient of 0.1. The MWCO can also be described as the molecular mass of the solute, such as for example dextrans or proteins, at which the membrane allows passage of 10% of these molecules. For purposes of the present invention, the MWCO can be based or determined using a dextran solution in water and following DIN EN 1508637:2014.

With the present invention, a polymeric membrane can be formed wherein the polymeric membrane has an albumin loss during a simulated dialysis treatment of no more than 11 grams/dialysis session of 4 hours, or no more than 6 grams/dialysis session of 4 hours. The determination of the albumin loss is carried out according to Example 5 of WO 2015/118045 A1; however, instead of a dialysis machine AK200, a dialysis machine 5008S (Fa. Fresenius) is used.

A formed polymeric membrane with a high MWCO such as from 40 kDa to 120 kDa or from 40 kDa to 90 kDa can be formed with the present invention.

The polymeric membrane can have a molecular weight retention onset of from 9.0 kDa to 14.0 kDa. For purposes of the present invention, the MWRO can be based or determined using a dextran solution in water and following DIN EN 1508637:2014.

In the methods to form the polymeric membrane of the present invention and/or in the polymeric membrane formed, as an option, the amount of hydrogen peroxide present in the polymeric membrane can be 0.01 ppm to 100 ppm $H_2O_2$, preferably less than 10 ppm $H_2O_2$.

Further details of the method and components used are described in more detail below.

The present invention can be useful where the polymeric membrane or fiber is a polyarylether polymer(s) fiber, such as a sulfone polymer fiber, like a polysulfone fiber. For purposes of the present invention, a "polysulfone based fiber" can be considered a polysulfone fiber.

The hydrophilic polymer can be one or more types of PVP. The total PVP present can be from about 0 wt % to about 25 wt %, such as 8 wt % or higher; or 1 wt % to 8 wt %; or from about 4 wt % to about 6 wt %. Weight percents are based on the weight of the spin mass.

The weight percent (unless stated otherwise) with regard to the solution or casting solution or spin mass is based upon the total weight percent of the solution or casting solution or spin mass, and the weight percent with regard to the precipitation fluid or bore fluid is with regard to the total weight percent of the precipitation fluid or bore fluid.

The polymer present in the spin mass and ultimately the polymeric membrane can be one or more polyarylether polymers, for example, sulfone polymers. Sulfone polymers include the diphenylsulfone group of the following formula I:

I

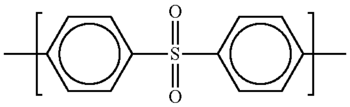

The sulfone polymers produced by the processes of the present invention can be, for example, a polysulfone, polyethersulfone, polyarylsulfone (PAS), cycloaliphatic sulfones, or any combinations thereof.

Polysulfone, also referred to as polybisphenolsulfone, can have the repeat unit of the following formula II:

II

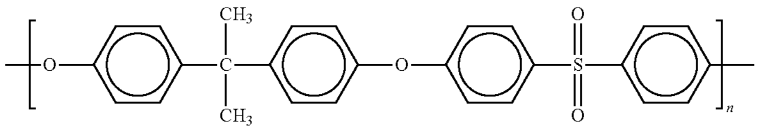

Polyethersulfone can have the following repeat unit of the following formula III:

III

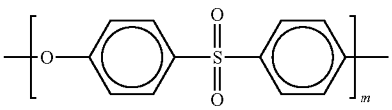

The polysulfones can be constituted, for example, by units of the formulae II alone, III alone, or both (i.e., copolymers thereof). The phenyl groups in these formulae II and III independently can be non-substituted or substituted. If substituted, the phenyl groups can, for example, have 1-4 substituents which are independently selected from hydrogen, $C_1$ to $C_6$ alkyl, or $C_4$ to $C_8$ cycloalkyl. The polysulfones have no substituents on the phenyl groups in compounds of one particular embodiment of the present invention. For homopolymers comprising units of formula II or formula III, or copolymers including both repeat units, n, m, or both can be selected to provide a polymer having any of the above indicated weight average molecular weights for the polyarylether products. These polysulfones may be used separately or as blends.

Other polyarylsulfone polymers that can be provided by the present invention comprise, for example, units of formula I and at least one of the following formulae IV and V:

IV

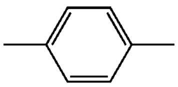

V

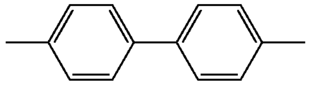

where the units I, IV and/or V can be attached to each other by an ether linkage (—O— bond), and the phenyl groups in these formulas independently can be non-substituted or substituted with the indicated substituents. As an option, the polyarylsulfones have no substituents on the phenyl groups. The polymers comprising units of formula I and at least one of formulas IV and V can be random or ordered.

A method of spinning a polymeric membrane can include providing a spin mass that includes at least one polyarylether polymer (e.g., a sulfone polymer(s) like a polysulfone) and at least one solvent (e.g., organic solvent) and providing a bore fluid that contains at least one solvent (e.g., at least one aqueous solvent and/or at least one organic solvent). The method further includes combining the spin mass and bore fluid to form a polymeric membrane, such as a polyarylether polymer membrane (e.g., a sulfone polymer membrane like a polysulfone membrane).

In wet spinning polymeric membrane, for example, the polymer-membrane forming substances are pre-dissolved or dissolved in solvent to provide a casting solution that can be spun through a ring duct of a spinneret having an external ring duct that can contain the spin mass and a polymeric core through which a precipitating solution (bore fluid) is simultaneously fed, and the solutions are cast into an aqueous bath separated from the spinneret by an air gap where precipitation of fiber components occurs. A substantial portion of the solvents can be dissolved and washed out of the membrane formed, and the membrane can be collected, dried, and cut to desired lengths.

The spin mass can have a viscosity, for example, of from about 500 to 10,000 cps or higher and more specifically 1,000 to 2,500 cps (centipoise) at about 40° C. These viscosity values can be measured with a standard rotary viscosity measuring instrument, such as a Haake instrument. The casting solution can be freed of undissolved particles, if present, by filtering it, and can then be supplied to an extrusion or wet-spinning spinneret.

A wet-spinning spinneret that can be used for spinning polymeric membrane of the present invention can be of any appropriate type, for example, as shown in U.S. Pat. Nos. 3,691,068; 4,906,375; and 4,051,300, all of which are incorporated in their entireties by reference herein. The indicated casting solution can be pumped to an annular extrusion spinneret having concentric tubes. For example, the outer diameter orifice can be from about 0.3 mm to 0.5 mm and the inner diameter can be from about 0.2 mm to about 0.4 mm, or other suitable sizes. The casting solution can be supplied to the spinneret simultaneously with a precipitating solution (bore fluid) to form a spinning composition.

The spinneret or nozzle, for example, can have a ring duct with a diameter equaling or approximating the desired outer diameter of the polymeric membrane. A spinneret hollow core can typically project coaxially into and through this duct through which the precipitating solution is fed simultaneous with casting solution being fed between the outer surface of the hollow core and inner bore of the ring duct. In this respect, the outer diameter of the hollow core can generally be equal to or approximate the desired inner diameter of the hollow fiber, that is to say, the lumen diameter thereof. The precipitating solution (bore fluid) can be pumped through this hollow core so that the precipitating solution emerges from the core tip and makes contact with the hollow membrane configuration that is made up of the extruded casting solution (spin mass). The precipitating solution can initiate the precipitation of the membrane building polymer in the casting solution (polymer solution).

The amount or ratio of the precipitating solution supplied to the casting solution in the spinneret can be dependent, for example, on the dimensions of the wet-spinning spinneret, and accordingly, the dimensions of the finished hollow membrane. Upon precipitation, as an option, the dimensions of the membrane are not changed to be different from those of the hollow membrane configuration before precipitation but after extrusion. For this purpose, the ratios of the volumes used of precipitating solution to polymer solution can be in a range, for example, of from about 1:0.5 to about 1:5, with such volumetric ratios being equal, for an equal exit speed of the precipitating solution and of the casting solution, to the area ratios of the hollow membrane, i.e., the ring-area formed by the polymeric substance and the area of the fiber lumen. The precipitating solution can be supplied to the extruded configuration directly upstream from the spinneret such that the inner or lumen diameter of the extruded and not-yet-precipitated configuration generally corresponds to the dimensions of the ring spinneret, from which the material is extruded. Some spinneret designs also may allow the use of a second fluid to be applied to the outside of the fiber during spinning.

A hollow membrane can be formed by the precipitating solution acting in an outward direction on the polymer solution after issuing from the wet-spinning spinneret. The precipitation can be generally terminated before the hollow membrane gets as far as the surface of a rinsing bath that dissolves the organic liquid contained in the hollow membrane and finally fixes the membrane structure. When precipitation takes place, the first step can be for the inner face of the membrane-like structure to be coagulated so that a dense discriminating layer in the form of a barrier for molecules that are larger than about 60,000 Daltons can be formed. That is, anything smaller than albumin can pass through. With an increase in the distance from this barrier, there is an increasing dilution of the precipitation solution with the solvent contained within the spinning composition so that the precipitation properties become less vigorous in an outward direction. A consequence of this can be that a coarse-pored, sponge-like structure is formed in a radially outward direction which can function as a supporting layer for the radially inner membrane.

When precipitation takes place, a portion of the hydrophilic polymer (e.g., PVP) if used, (in addition to the polyarylether polymer—e.g., a sulfone polymer like polysulfone), can be dissolved out of the spinning composition, whereas a portion can be retained in the coagulated fiber. From about 5% to about 95% by weight of the second polymer (e.g., the hydrophilic polymer(s)) can be dissolved out of the spinning composition so that from about 95% (or more) to about 5% by weight of the hydrophilic polymer used can be left therein. As an example, a majority of the hydrophilic polymer, e.g., PVP, can remain in the membrane. For instance, 50 wt % to 99 wt %, 51 wt % to 90 wt %, 60 wt % to 80 wt % of the hydrophilic polymer can remain in the membrane. Pore formation can be caused by movement of the PVP toward the inner lumen of the membrane without necessarily being dissolved out.

Draft refers to exit speed of the fiber-like structure from the ring spinneret as differing from (and usually greater than) the speed at which the precipitated fiber is drawn off. Draft can cause stretching of the membrane structure as it issues from the ring spinneret during the fiber precipitation in such a way that the pores formed are stretched in the draft direction and for this reason can be permanently deformed. Fiber spun with a draft can have an ultrafiltration rate that can be either significantly lower or higher than with a fiber produced without such spinneret draft. The speed of emergence of the spinning composition from the spinneret and the drawing off speed of the fiber produced can be made generally the same to avoid spinning draft and reduce possible occurrence of pore deformations or formation of constrictions of the fiber lumen and thinning out of the fiber wall. As an option, the pumping rate of the precipitative fiber can be slower than the draw rate from the spinneret, which causes a drawing of the membrane or fiber and reduces its diameter. This drawing or pulling can optionally be used to form the membrane or fiber.

A further spinning parameter is the distance between the surface of the rinsing bath and the spinneret, because such distance is controlling for the precipitation time at a given speed of downward motion, that is to say, a given speed of extrusion. This distance can be dependent on the viscosity, the weight and the precipitation rate of the membrane or fiber. The distance between the spinneret and the precipitating bath can be set at a distance, for example, of no greater than about one meter. After precipitation, the coagulated membrane or fiber can be rinsed in a bath that normally contains water and in which the hollow fiber is kept, such as for about 3 minutes to 10 minutes or more, for washing out the dissolved organic constituents and for fixing the microporous structure of the membrane or fiber. After that, the membrane or fiber can be passed through a hot drying zone. The hollow membrane or fiber produced can have a thin inner radial barrier layer on the inside surface which is adjacent to an outer open-pore support layer. For example, where the hydrophilic polymer is included in the spinning solutions, the inner face fiber manufactured can contain a dense barrier layer which has a pore diameter, for example, of from about 0.0005 μm to about 0.1 μm, or other values. Adjacent to this inner barrier layer on the outside thereof, there can be a foam-like supporting structure.

The hollow membrane or fiber can be texturized in order to improve the exchange properties thereof. After this, the membrane or fiber so produced can be handled in conventional manners, for example, by winding onto a bobbin or wheel, cutting the membrane or fibers to a desired length, and/or used in manufacture of dialyzers using the cut membrane or fiber in a conventional manner.

In the alternative, the spin mass can be extruded or cast to form sheets. Methods and equipment suitable for casting membrane films or sheets using the reactor solutions of the present invention include those, for example, described in U.S. Pat. No. 3,691,068. The spin mass also can be coated and solidified in place as a continuous or discontinuous coating or film on a substrate surface (e.g., woven or non-woven).

As a specific example of the present invention, a method of spinning a polyarylether polymer fiber (e.g., a sulfone polymer fiber like a polysulfone fiber) is provided that includes the steps of providing a spin mass containing at least one polyarylether polymer (e.g., sulfone polymer(s) like polysulfone), at least one hydrophilic polymer, such as PVP, and at least one solvent (e.g., organic solvent); providing a bore fluid containing at least one solvent, such as at least one aqueous solvent and at least one organic solvent; and combining the spin mass and bore fluid to form a polyarylether polymer fiber (e.g., a sulfone polymer fiber like a polysulfone fiber).

When PVP is used in preparing the spin mass, as an option, the PVP can be added in powder form.

The spin masses of the present invention as an option can contain low amounts of water. For instance, the spin masses can contain 4 wt % water or less (based on the weight of the spin mass), such as 0.001 wt % to 4 wt %, 0.01 wt % to 4 wt %, 0.1 wt % to 4 wt %, 0.5 wt % to 3.5 wt %, 0.75 wt % to 3 wt %, 0.9 wt % to 1.7 wt %, and the like.

The spin masses once formed and prior to being used are preferably clear and are not cloudy. In other words, the spin mass solution is transparent and not opaque. The spin mass solution is preferably as clear as water (though a different color than water).

The reference to molecular weight herein and throughout is a reference to weight average molecular weight in Daltons, unless stated otherwise.

PVP can be characterized by K values. The K values assigned to various grades of PVP represent a function of the average molecular weight, the degree of polymerization, and the intrinsic viscosity. The PVP used in the present invention can have any K value. The PVP used can be one or more low MW PVP, one or more medium MW PVP, and/or one or more high MW PVP. Any combination with any wt % for each of the low MW, medium, MW, and high MW PVP can be utilized in the present invention.

Examples of low MW PVP include, but are not limited to, at least one of PVP K12, PVP K30, or any PVP with a K value (or K value range) of from 1 to 36, or any combinations thereof. The spin mass can contain less than 25 wt % low MW PVP by weight of the total PVP present in the spin mass (e.g., 0.001 wt % to 24 wt %, 1 wt % to 10 wt %, 1 wt % to 5 wt %, 0.01 wt % to 3 wt %, 0.01 wt % to 1 wt %). The low MW PVP can have a weight average molecular weight of below 100 kDa. As an option, the spin mass (that is, the total PVP content in the spin mass based on the total weight percent of PVP), can have less than about 90 wt %, less than about 75 wt %, less than about 50 wt %, less than about 25 wt %, less than about 15 wt %, less than about 7.5 wt %, less than about 5 wt %, less than about 2.5 wt %, less than about 1 wt %, less than 0.1 wt %, or less than about 0.001 wt % low MW PVP, by weight of the spin mass (based on the total weight percent of PVP present in the spin mass) and/or bore fluid. For these ranges, a lower limit can be 0.0001 wt %.

As an option, the spin mass and/or the bore fluid includes no low MW PVP.

As an option, the spin mass and/or the bore fluid contains a medium MW PVP. The spin mass can contain less than 25 wt % medium MW PVP by weight of the total PVP present in the spin mass (e.g., 0.001 wt % to 24 wt %, 1 wt % to 10 wt %, 1 wt % to 5 wt %, 0.01 wt % to 3 wt %, 0.01 wt % to 1 wt %). The medium MW PVP can have a weight average molecular weight of from 100 kDa to less than 900 kDa, such about 100 kDa to 850 kDa (or a K value of K37 to K79). As an option, the spin mass (that is, the total PVP content in the spin mass based on the total weight percent of PVP), can have less than about 90 wt %, less than about 75 wt %, less than about 50 wt %, less than about 25 wt %, less than about 15 wt %, less than about 7.5 wt %, less than about 5 wt %, less than about 2.5 wt %, less than about 1 wt %, less than 0.1 wt %, or less than about 0.001 wt % medium MW PVP, by weight of the spin mass (based on the total weight percent of PVP present in the spin mass) and/or bore fluid. For these ranges, a lower limit can be 0.0001 wt %. The medium MW PVP can be or include PVP having a K value or K value range of from K37 to 79, such as from K40 to K75, K40 to K55, K41 to K54, K45 to K70, K45 to K65, K45 to K60, K45 to K55 or any individual K value in these ranges.

As an option, the spin mass and/or the bore fluid includes no medium MW PVP.

As an option, the spin mass can contain a high MW PVP; wherein the spin mass (based on the total weight of the spin mass or based on the total weight percent of PVP present in the spin mass) contains less than 50 wt % high MW PVP by weight of the spin mass wherein the high MW PVP has a weight average molecular weight of equal to or greater than 900 kDa (or a K value of K80 or higher). As an option, the spin mass (based on the total weight of the spin mass or based on the total weight percent of PVP present in the spin mass) has less than about 90 wt %, less than about 75 wt %, less than about 50 wt %, less than about 25 wt %, less than about 15 wt %, less than about 7.5 wt %, less than about 5 wt %, less than about 2.5 wt %, less than about 1 wt %, less than 0.1 wt %, or less than about 0.001 wt % high MW PVP. For these ranges, a lower limit can be 0.0001 wt %. The high MW PVP can have a K value or K value range of from K80 to K105 or higher, such as from K80 to K90, K81 to K88 or K81 to K86 or any individual K value in these ranges. The high MW PVP used in the examples had a weight average MW~900,000 Da.

As an option, the spin mass and/or the bore fluid includes no high MW PVP.

The polymeric membrane of the present invention can have one or more of the following properties:

a) a zeta (streaming) potential of from about −100 mV to about 100 mV, such as from about −60 mV to +60 mV, or from about −60 mV to +20 mV;
b) an ultrafiltration constant ($K_{UF}$) of from about 100 ml/hr*mmHg*$m^2$ to about 1000 ml/hr*mmHg*$m^2$;
c) an albumin sieving coefficient of from about 0.001% to about 1%; preferred from 0.1% to 1.5%, more preferred from 0.2 to 1%.
d) a vitamin $B_{12}$ clearance rate of from about 150 ml/min to about 250 ml/min at $Q_b/Q_d$=300/500 ml/min;
e) a creatinine clearance rate of from about 50 ml/min of creatinine to about 290 ml/min of creatinine with $Q_b/Q_d$=300/500 ml/min;
f) a sodium clearance rate of from about 30 ml/min of sodium to about 300 ml/min of sodium with $Q_b/Q_d$=300/500 ml/min;
g) a beta-2-microglobulin clearance rate of from about 10 ml/min of beta-2-microglobulin to about 250 ml/min of beta-2-microglobulin with $Q_b/Q_d$=300/500 ml/min;
h) a middle molecule (lysozyme) clearance rate of from about 50 ml/min of lysozyme to about 250 ml/min of lysozyme with $Q_b/Q_d$=300/500 ml/min; and/or
i) a water absorption capacity of from 1% to 10%.

As an option, all of properties a) through i) can be present, or two or more, three or more, four or more, five or more, six or more, seven or more, or eight or more.

The polymeric membrane can have the following membrane geometry: an outside diameter of from about 100 μm to about 0.5 mm, an interior diameter of from about 100 μm to about 0.5 mm, a wall thickness of from about 0.001 μm to about 250 μm, and a length of from about 0.01 m to about 1 m. The polymeric membrane can have a tensile strength of from about 0.1 to about 10 MPa. It is to be understood that the membrane and performance properties described earlier and below can be present in any of the membrane described in the present invention, including the mentioned sub-ranges and the like.

The polymeric membrane can have a zeta (streaming) potential of from about −500 mV to about 500 mV, from about −250 mV to about 250 mV, from about −100 mV to about 100 mV, from about −60 mV to +60 mV, from about −60 mV to +20 mV from about −25 mV to about 25 mV, or from about −10 mV to about 10 mV. The water permeability of membranes formed from the fibers can be evaluated by determining the ultrafiltration coefficient ($K_{UF}$). The $K_{UF}$ is defined as the number of milliliters of fluid per hour that transfers across the membrane per mm Hg pressure gradient across the membrane. The polymeric membrane can have a water permeability ($K_{UF}$ per area), for example, of from about 1 to about 1000 ml/hr·mm Hg·$m^2$ or higher, from about 10 to about 50 ml/hr·mm Hg·$m^2$, from about 25 to about 1000 ml/hr·mm Hg·$m^2$ from about 30 to about 900 ml/hr·mm Hg·$m^2$, from about 100 to about 600 ml/hr·mm Hg·$m^2$, or from about 150 to about 250 ml/hr·mm Hg·$m^2$, greater than about 750 ml/hr·mm Hg·$m^2$, or other values.

The polymeric membrane can have a water absorption capacity, for example, of from about 1% to about 10% by weight, or from about 2% to about 9% by weight, or from about 3% to about 8% by weight, or other values. The water absorption capacity can be ascertained in the following manner. Water-vapor saturated air is passed at room temperature (25° C.) through a dialyzer fitted with the hollow fibers and in a dry condition. In this respect, air is introduced under pressure into a water bath and after saturation with water vapor is run into the dialyzer. As soon as a steady state has been reached, it is then possible for the water absorption capacity to be measured.

The polymeric membrane of the present invention can be designed with a variety of sieving/clearance properties. Clearance data can be measured on the polymeric membrane of the present invention, for example, according to DIN 58,352. The polymeric membrane can have an albumin sieving coefficient of less than about 20%, from about 0.001% to about 1%, from about 0.01% to about 0.75%, from about 0.1% to about 0.5%, from about 0.05% to about 10%, or more than 0.5%. For example, the maximum blood flow for a patient can be from about 450 ml/min to about 500 ml/min. The polymeric membrane can have an albumin sieving coefficient less than about 20% and clearance rate less than 100% of the blood side flow rate. The polymeric membrane into a dialyzer, for example, of about 1.4 $m^2$ area, can have a vitamin $B_{12}$ clearance rate of from about 1 ml/min of vitamin $B_{12}$ to about 300 ml/min of vitamin $B_{12}$, from about 10 ml/min of vitamin $B_{12}$ to about 300 ml/min of vitamin $B_{12}$, from about 150 ml/min of vitamin $B_{12}$ to about 250 ml/min of vitamin $B_{12}$, or from about 75 ml/min of vitamin $B_{12}$ to about 150 ml/min of vitamin $B_{12}$ (e.g., each at $Q_b/Q_d$=300/500 ml/min). The vitamin $B_{12}$ clearance rate can be about 250 ml/min at $Q_b/Q_d$=300/500 ml/min. The polymeric membrane fabricated into a dialyzer, for example, of about 1.4 $m^2$ area, can have a middle molecule (lysozyme) clearance rate of from about 1 ml/min of lysozyme to about 300 ml/min of lysozyme, from about 10 ml/min of lysozyme to about 300 ml/min of lysozyme, from about 50 ml/min of lysozyme to about 250 ml/min of lysozyme, or from about 75 ml/min of lysozyme to about 150 ml/min of lysozyme. The lysozyme clearance rate can be about 92 ml/min. Any of the clearance rates can be stated in respect to $Q_b/Q_d$=300/500 ml/min.

The polymeric membrane fabricated into a dialyzer, for example, of about 1.4 $m^2$ area, can have a creatinine clearance rate of from about 1 ml/min of creatinine to about 300 ml/min of creatinine, from about 10 ml/min creatinine to about 300 ml/min of creatinine, from about 50 ml/min of creatinine to about 290 ml/min of creatinine, or from about 75 ml/min of creatinine to about 150 ml/min of creatinine. The polymeric membrane fabricated into a dialyzer, for example, of about 1.4 $m^2$ area, can have a beta-2-microglobulin clearance rate of from about 1 ml/min of beta-2-microglobulin to about 300 ml/min of beta-2-microglobulin, from about 10 ml/min of beta-2-microglobulin to about 300 ml/min of beta-2-microglobulin, from about 20 ml/min of beta-2-microglobulin to about 200 ml/min of beta-2-microglobulin, or from about 30 ml/min of beta-2-microglobulin to about 150 ml/min of beta-2-microglobulin. Any of the clearance rates can be stated in respect to $Q_b/Q_d$=300/500 ml/min.

Sodium clearance can be ascertained with aqueous solutions for the polymeric membrane (e.g., hollow fibers) having 1.25 square meters of active surface area according to DIN 58,352 at a blood flow rate of about 280 ml/min. The clearance is equal to or lower than the blood flow or inlet flow. The sodium clearance of hollow fibers of the present invention can be, for example, from about 200 to about 300, or from about 250 to about 275, or from about 260 to about 280, or from about 265 to about 275, or other values. The polymeric membrane can have a sodium clearance rate of from about 1 ml/min of sodium to about 300 ml/min of sodium, from about 10 ml/min of sodium to about 300 ml/min of sodium, from about 50 ml/min of sodium to about 290 ml/min of sodium, or from about 75 ml/min of sodium to about 295 ml/min of sodium. Any of the clearance rates can be stated in respect to $Q_b/Q_d$=300/500 ml/min. For example, a sodium clearance rate can be from about 30 ml/min of sodium to about 300 ml/min of sodium with $Q_b/Q_d$=300/500 ml/min.

The polymeric membrane can have any membrane or fiber geometry. For instance, the membrane or fiber can have an outside diameter of from about 1 μm to about 1 mm, from about 5 μm to about 500 μm, from about 25 μm to about 250 μm, from about 15 μm to about 150 μm, or from about 50 μm to about 100 μm. For example, the outside diameter can be about 420 μm. The interior diameter can be from about 10 μm to about 1 mm, from about 25 μm to less than 500 μm, from about 50 μm to about 250 μm, from about 15 μm to about 150 μm, or from about 50 μm to about 100 μm. The wall thickness can be about from about 0.001 μm to less than 250 μm, from about 0.01 μm to about 100 μm, from about 0.1 μm to about 50 μm, from about 1 μm to about 25 μm, or from about 10 μm to about 20 μm. The membrane or fiber length can be from about 0.01 m to about 1 m, such as from about 25 cm to about 60 cm. The polymeric membrane can have a tensile strength of from about 0.1 to about 10 MPa, from about 0.1 to about 5 MPa, from about 1 to about 5 MPa, from about 2 to about 8 MPa or more. Alternatively, tensile strength can be measured in g(force). For example, a membrane or fiber can withstand a g(force) of from about 1 g(force) to about 50 g(force), from about 5 g(force) about 40 g(force), from about 10 g(force) to about 30 g(force), less than about 2 g(force), or greater than about 50 g(force). For example, a membrane or fiber withstanding from about 18 g(force) to about 30 g(force), can have a wall thickness of about 15 μm or greater, an outside diameter of about 215 μm, and an interior diameter of about 185 μm. The interior diameter can be about 140 μm or higher for a membrane or fiber having an outer diameter of about 170 μm.

Membranes of the present invention can have an excellent separation boundary. The sieving coefficients, for example, can be measured as 1.0 for Vitamin $B_{12}$, about 0.99 for inulin, from about 0.9 to about 1.0 for myoglobin, and under 0.01 for human albumin, or other values. The outer diameter of the membrane (e.g., hollow fibers), for example, can equal to about 0.1 to about 0.4 mm, whereas the thickness of the membrane can be about 10 to about 100 μm or from about 15 to about 50 μm. The polymeric membrane produced with the present invention can approximate, at least in part, natural kidney function with respect to separating properties (e.g., sieving coefficient).

In the present invention, the membranes can be, for example, flat sheet or hollow fiber.

The membranes can be used, for example, for dialysis membranes, ultrafiltration membranes, or microfiltration membranes.

The dialysis membranes can be, for example, hemodialysis membranes.

Semi-permeable membrane filtration can be used in the purification of proteins, including microfiltration and ultrafiltration. Microfiltration can be defined as a low-pressure membrane filtration process which removes suspended solids and colloids generally larger than about 0.1 μm in diameter. Such processes can be used to separate particles or microbes such as cells, macrophage, and cellular debris. Ultrafiltration membranes are characterized by pore sizes which enable them to retain macromolecules having a molecular weight ranging from about 500 to about 1,000,000 Daltons. Ultrafiltration is a low-pressure membrane filtration process that can separate solutes, in some cases, up to about 0.1 μm in size, such as in a range of from about 0.01 μm to about 0.1 μm. Ultrafiltration can be used for concentrating proteins and removing bacteria and viruses from a solution. Ultrafiltration also can be used for purification treatments, such as water purification. Dialysis membranes can be ultrafiltration membranes that contain biocompatible materials. When the membranes are hollow fibers, the hollow fibers can be microporous and capable of withstanding from about 5 psi to about 2,000 psi or more applied pressure without collapse.

The polymeric membrane made from the present invention can have one or more improved properties. The improvement in one or more properties can be determined by comparing the polymeric membrane made by the present invention to a comparative membrane that is made using the same method parameters but no sonication is used. For purposes of the present invention, this is the "comparative membrane".

With the present invention, the polymeric membrane can have a lower degree of leaching compared to the comparative membrane.

With the present invention, the polymeric membrane can have a higher concentration of additive (e.g., an 'additional additive' as defined herein or an incompatible additive) compared to the comparative membrane. An incompatible additive is an additive that is not soluble with the main polymer that forms the membrane, for instance, the hydrophobic polymer (e.g., the polysulfone). An additive can be the hydrophilic polymer that can be used, generally in smaller amounts compared to the hydrophobic polymer, such as the PVP and the like.

With the present invention, the polymeric membrane can have improved one or more of the following (as compared to the comparative membrane): pore size distribution, molecular weight cut-off value, or molecular weight retention onset value.

With sonication conducted on the solution and/or while the solution is in the spinning block or while the solution is being casted if that option is used, the sonication has the ability to cause mixing on a microscopic level of the non-solvent components that form the solution and ultimately the polymeric membrane. For instance, when the solution contains at least one hydrophobic polymer with at least one hydrophilic polymer and/or a surface modifying composition, sonication of the solution and/or at the spinning block can provide microscopic level mixing to provide a homogenous mixture.

With sonication occurring in the washing bath or rinsing bath, the residence time of rinsing can be reduced and yet achieve the same rinsing results as compared to the comparative membrane. For instance, the residence time for rinsing can be reduced by at least 5% or at least 10% or at least 15% as compared to the comparative membrane.

With sonication occurring in the washing bath or rinsing bath, the size of the bath can be reduced and yet achieve the same rinsing results as compared to the comparative membrane. For instance, the size of the bath (volume) can be reduced by at least 5% or at least 10% or at least 15% as compared to the bath used to make the comparative membrane and achieve the same results.

With sonication occurring in the drying chamber, the sonication has the ability to enhance water removal and/or prevent or reduce hollow fiber or hollow fiber collapsing during drying of the polymeric hollow fiber membrane.

With sonication occurring at or in the spinning block, the sonication can reduce, control, and/or remove undesirable accumulation of material on the spinning block or parts thereof and/or the spinning equipment other than the spinning block itself (e.g., guides, rollers and the like). Preferably, the accumulation is reduced and/or not present with the methods of the present invention. The reduction can be at least 10%, at least 25%, at least 50%, at least 75%, at least 90% or at least 95% compared to the same device where no sonication is used. The % is based upon total build-up by weight that occurs in the absence of sonication.

As shown herein, the present invention primarily involves the use of sonication before and/or during the fiber forming process. While sonication can be utilized in post-production of the fiber, the purpose and/or results would be different than sonication done before and/or during the fiber forming process. For instance, post-production sonication may be used to clean or remove component in the membrane that is already formed to achieve a higher permeability. It may also cause polymer chains to vibrate and align into crystalline structure (annealing). This type of post treatment method will not change the morphology of the membrane because the membrane had been solidified prior to sonification exposure. For the case of crystallinity improvement, the membrane could become harder, but the morphology remains the same. Applying sonication before and during membrane formation changes how polymers entangle and precipitate as the morphology forms.

The use of sonication in the present invention is particularly effective for hollow fiber membranes and these benefits would not be achieved or not achieved on the same level with respect to sonication of a finished product and/or a non-hollow fiber membrane, such as a finished flat sheet membrane cartridge.

In one aspect of the present invention, the methods of the present invention utilize sonication as part of a continuous manufacturing process to product polymeric membranes (flat or fiber).

With the present invention, the fiber that is formed during the process is preferably only exposed to sonication for a small fraction of time. Unlike post-production use of sonication, the sonication during the manufacturing process of the present invention involves, for example, exposure of the fiber to sonication for a period of from about 0.5 second to about 20 minutes (such as from about 1-5 seconds, about 5-10 seconds, about 10-30 seconds, about 30 seconds to about 60 seconds, or from about 30 seconds to 20 minutes, or from about 1 minute to 20 minutes, or from about 3 minutes to 20 minutes, or from about 5 minutes to about 15 minutes, or from about 5 minutes to about 10 minutes and any amounts within these ranges or above any one or more of these ranges).

The following examples further illustrate the invention but should not be construed as in any way limiting its scope.

Example 1:

Hollow fiber membrane was spun at ~420 mm/s using a non-solvent induced phase separation method. The spin dope (or spin mass) was made of 16 wt % polysulfone, 4 wt % polyvinylpyrrolidone K90, and 1.1 wt % fluorinated polyurethane additive (PU) in dimethylacetamide (DMAC) (wt % based on total weight of spin dope or spin mass). The bore fluid (or precipitation fluid) was made of DMAC/water and its concentration was adjusted to achieve a membrane water permeability of ~150 ml/h·mmHg·$m^2$. Spin dope pump and bore fluid pump rates were adjusted to achieve an inner diameter of ~175 micron and wall of ~34 micron. The fibers were dried going through a drying chamber and collected on wheel for further processing and testing. The finish fiber had a polyvinylpyrrolidone and polyurethane contents of 4.10±0.06% (n=3) and 4.87±0.04% (n=3), relatively, by Thermogravimetric Analysis (TGA).

Example 2:

Hollow fiber membrane was spun in accordance with Example 1 but in the presence of 600 W 28 KHz sonication energy at the center of the 0.5 $m^3$ precipitation bath. The PVP and PU contents (by wt % and based on total weight of fiber) in the fiber were 4.34±0.10 wt % (n=3) and 5.09±0.06 wt % (n=3), respectively. In comparison with Example 1, sonication was shown to positively enhance the entanglement of PVP and PU in the membrane.

Example 3:

A buildup of PU was simulated by smearing the polymer onto a metal object and placed in the precipitation bath in Example 2 more than 1 ft away from the sonicator to essentially show of the effects of no sonication since the distance away from the sonicator was sufficient to remove any sonication on the object. The PU buildup remained intact after 2 h of sonication exposure. Upon moving the buildup sample closer to the sonicator (<1 ft), the buildup was dispersed and was removed in less than 2 h. This buildup could came from the additive in the spin dope that is either dispersible but not sufficiently soluble in the spinning baths or material that coagulates in the spinning baths.

Example 4:

Hollow fiber membrane was spun in accordance with Example 1 but without the PU additive. The dryer was turned off during spinning and a 500 W sonication welder (or horn) was mounted such that the welder touched the fibers (8-fiber bundle) before they entered the dryer. Water mist was ejecting out of the fiber bundle when the sonication was turned on. Additional experiments were conducted to determine the amount of water removed by sonication at different spinning speeds, namely, 300 mm/s, 350 mm/s, 400 mm/s, 450 mm/s, 500 mm/s, 550 mm/s, and 600 mm/s. The fiber dimension of the fibers was kept constant by adjusting spin dope and bore fluid flow rates proportionally with the spinning speed. Water removed by sonication(S) was the weight difference of the wet fiber bundles collected with and without sonication. The total water in the fiber (T) was the weight difference of the wet fiber bundle collected without sonication and after it is completely dry. Percent water (by weight) removed by sonication is therefore S/T×100. 6% or more of water was removed by sonication alone and the amount removed tended to increase as the spinning speed increased. Specifically, at speeds of 300 mm/s 350 mm/s and 450 mm/s, the amount removed was about 6% At speeds of 400 mm/s and 500 mm/s, the amount removed was about 7%. At a speed of 550 mm/s, the amount removed was about 9%. At a speed of 600 mm/s, the amount removed was about 10%.

The present invention includes the following aspects/embodiments/features in any order and/or in any combination:

1. The present invention relates to a method of making a polymeric membrane, said method comprising:

a. providing a solution comprising at least one polymer and at least one solvent;

b. forming the polymeric membrane by either passing said solution through a spinneret to form a polymeric hollow fiber membrane, or casting said solution on a surface to form a polymeric sheet membrane;

c. passing said polymeric membrane from step b through at least one precipitation bath comprising an aqueous solution;

d. passing said polymeric membrane from step c through at least one washing bath;

e. passing said polymeric membrane from step d through at least one drying chamber; and f. collecting said polymeric membrane from step e, wherein one or more of said solution, said spinning block, said casting, said precipitation bath, said washing bath, or said drying chamber utilizes sonication.

2. The method of any preceding or following embodiment/feature/aspect, wherein said forming occurs in said spinning block and said passing of said solution further comprises passing a precipitation fluid through said spinneret to form the polymeric hollow fiber membrane.

3. The method of any preceding or following embodiment/feature/aspect, wherein said forming occurs by said casting to form said polymeric sheet membrane.

4. The method of any preceding or following embodiment/feature/aspect, wherein said at least one polymer comprises at least one hydrophobic polymer and at least one hydrophilic polymer in a solvent comprising at least one polar aprotic solvent.

5. The method of any preceding or following embodiment/feature/aspect, wherein said at least one hydrophobic polymer is poly(aryl)ethersulfone (PAES), polysulfone (PSF) or polyethersulfone (PES), or any combinations thereof.

6. The method of any preceding or following embodiment/feature/aspect, wherein said at least one hydrophobic polymer is at least one of polysulfone (PSF), polyethersulfone (PES), polyarylsulfone (PAS), polyarylethersulfone (PAES), polyvinylidene fluoride (PVDF), polyacrylonitrile (PAN), cellulose triacetate (CT), or a copolymer thereof.

7. The method of any preceding or following embodiment/feature/aspect, wherein said at least one hydrophilic polymer is polyvinylpyrrolidone (PVP), polyethylene glycol (PEG), polyvinyl alcohol (PVA), a copolymer of polypropylene oxide and polyethylene oxide (PPO-PEO), or any combinations thereof.

8. The method of any preceding or following embodiment/feature/aspect, wherein said at least one polar aprotic solvent is dimethylacetamide (DMAC), N-methyl-2-pyrrolidone (NMP), dimethylsulfoxide (DMSO), diphenylsulfone (DFS), or any combinations thereof.

9. The method of any preceding or following embodiment/feature/aspect, wherein said solution comprises from 10 wt % to about 30 wt % of the at least one hydrophobic polymer, from about 2 wt % to about 30 wt % of the at least one hydrophilic polymer, and from about 60 wt % to about 90 wt % of the at least one polar aprotic solvent.

10. The method of any preceding or following embodiment/feature/aspect, wherein said sonication comprises sonicating said solution prior to the solution entering the spinning block and/or during the solution preparation.

11. The method of any preceding or following embodiment/feature/aspect, wherein said forming occurs in said spinning block and said sonication comprises sonicating said solution while in the spinning block.

12. The method of any preceding or following embodiment/feature/aspect, wherein said sonication comprises sonicating said precipitation bath.

13. The method of any preceding or following embodiment/feature/aspect, wherein said sonication comprises sonicating said washing bath.

14. The method of any preceding or following embodiment/feature/aspect, wherein said sonication comprises sonicating in said drying chamber, or in between said washing bath and said drying chamber, or both.

15. The method of any preceding or following embodiment/feature/aspect, wherein said sonication is conducted at an oscillation frequency of at least 20 KHz.

16. The method of any preceding or following embodiment/feature/aspect, wherein said sonication is conducted at an oscillation frequency of from 20 kHz to 50 MHz.

17. The method of any preceding or following embodiment/feature/aspect, wherein said sonication is conducted with an ultrasonic apparatus.

18. The method of any preceding or following embodiment/feature/aspect, wherein said sonication is conducted with a tip or probe sonicator.

19. The method of any preceding or following embodiment/feature/aspect, wherein said sonication is conducted with a bath sonicator.

20. The method of any preceding or following embodiment/feature/aspect, wherein said sonication is a pulsed mode of sonication.

21. The method of any preceding or following embodiment/feature/aspect, wherein said sonication is a continuous mode of sonication.

22. The method of any preceding or following embodiment/feature/aspect, wherein said sonication occurs in a bath of liquid.

23. The method of any preceding or following embodiment/feature/aspect, wherein said sonication is direct sonication.

24. The method of any preceding or following embodiment/feature/aspect, wherein said sonication is indirect sonication.

25. The method of any preceding or following embodiment/feature/aspect, wherein said sonication is conducted at a power rating of at least 25 watts.

26. The method of any preceding or following embodiment/feature/aspect, wherein said sonication is conducted with an ultrasonic homogenizer.

27. The method of any preceding or following embodiment/feature/aspect, wherein a bath is sonicated from said sonication and said bath has a volume, and said sonication occurs at a power rating of sonication per gallon of liquid in bath to achieve at least 0.1 watt/gallon.

28. The method of any preceding or following embodiment/feature/aspect, wherein said sonication is conducted with a swept-frequency mode of sonication.

29. The method of any preceding or following embodiment/feature/aspect, wherein said solution further comprises at least one surface modifying composition.

30. The method of any preceding or following embodiment/feature/aspect, wherein said sonication is conducted on said solution and/or during said forming, and said sonication causes mixing on a microscopic level of said at least one hydrophobic polymer and said at least one hydrophilic polymer.

31. The method of any preceding or following embodiment/feature/aspect, wherein said sonication occurs continuously.

32. The method of any preceding or following embodiment/feature/aspect, wherein said forming occurs in said spinning block, and wherein said sonication comprises sonicating: said solution prior to the solution entering the spinning block, said solution while in the spinning block, said precipitation bath, said washing bath, and said drying chamber or in between said washing bath and said drying chamber or both.

33. The method of any preceding or following embodiment/feature/aspect, wherein said polymeric membrane has a lower degree of leaching compared to a polymeric membrane made using the same method but in the absence of sonication.

34. The method of any preceding or following embodiment/feature/aspect, wherein said polymeric membrane has a higher concentration of incompatible additives, 'additional additive', or other additive compared to a polymeric membrane made using the same method but in the absence of sonication.

35. The method of any preceding or following embodiment/feature/aspect, wherein said polymeric membrane has improved at least one of pore size distribution, molecular weight cut-off value, or molecular weight retention onset value compared to a polymeric membrane made using the same method but in the absence of sonication.

36. The method of any preceding or following embodiment/feature/aspect, wherein said sonication occurs in said rinsing bath wherein a residence time of rinsing or the flow rate of rinsing is reduced to achieve rinsing compared to a polymeric membrane made using the same method but in the absence of sonication.

37. The method of any preceding or following embodiment/feature/aspect, wherein a size of said rinsing bath is reduced to achieve said rinsing compared to a polymeric membrane made using the same method but in the absence of sonication.

38. A further embodiment or feature is a spinning block for producing polymeric membrane, said spinning block comprising at least one spinneret having an external ring duct for a spin mass and a hollow core through which a precipitating solution is simultaneously fed, and at least one sonicator mounted to or on the spinning block.

39. A further embodiment or feature is method of making a polymeric membrane, said method comprising forming said polymeric membrane from a non-solvent induced phase separation process wherein sonication is utilized during said forming.

40. The method of any preceding or following embodiment/feature/aspect, wherein said sonication occurs in a drying chamber and/or immediately before the drying chamber, wherein said sonication prevents or reduces collapsing during drying of the polymeric membrane.

41. The method of any preceding or following embodiment/feature/aspect, wherein said sonication reduces undesirable accumulation of material on the spinning block and/or spinning equipment other than said spinning block.

42. The method of any preceding or following embodiment/feature/aspect, wherein said solution has at least one additive present that causes material build up or accumulation on the equipment or portion thereof used in the method of making the polymeric membrane.

43. The method of any preceding or following embodiment/feature/aspect, wherein said at least one additive is said at least one polymer present as part of the solution.

44. The method of any preceding or following embodiment/feature/aspect, wherein said at least one additive is at least one PVP.

45. The method of any preceding or following embodiment/feature/aspect, wherein said at least one additive is a crystal nucleation agent, a surface modifying macromolecule or surface modifying composition, an anti-oxidant (e.g., vitamin E), a surface active molecule, a cross-linker, a ligand carrying macromolecule or polymer, a charged polymer, a compatibilizer, a salt, or glycerol or any combinations thereof.

46. The method of any preceding or following embodiment/feature/aspect, wherein said surface modifying macromolecule comprises one or more surfactants, Zwitterionic compound, fluorinated polyurethane, or any combinations thereof.

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, a preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of making a polymeric membrane, said method comprising:

a) providing a solution comprising at least one polymer and at least one solvent;

b) forming the polymeric membrane by either passing said solution through a spinning block to form a polymeric hollow fiber membrane, or casting said solution on a surface to form a polymeric sheet membrane;

c) passing said polymeric membrane from step (b) through at least one precipitation bath comprising an aqueous solution;

d) passing said polymeric membrane from step (c) through at least one washing bath comprising a further aqueous solution;

e) passing said polymeric membrane from step (d) through at least one drying chamber; and f) collecting said polymeric membrane from step (e), wherein sonication of said solution occurs in said spinning block and/or sonication of said polymeric membrane occurs in said spinning block and/or occurs after exiting said spinning block but before said at least one precipitation bath, and/or occurs in said at least one drying chamber or right before said at least one drying chamber but after said at least one washing bath.

2. The method of claim 1, wherein said solution has at least one additive present that causes material accumulation or build up on the equipment or portion thereof used in the method of making the polymeric membrane.

3. The method of claim 1, wherein said at least one polymer comprises at least one polyvinylpyrrolidone.

4. The method of claim 2, wherein said at least one additive is a crystal nucleation agent, a surface modifying macromolecule or surface modifying composition, an anti-oxidant, a surface-active molecule, a cross-linker, a ligand carrying macromolecule or polymer, a charged polymer, polyvinylpyrrolidone, a compatibilizer, a salt, or glycerol, or any combinations thereof.

5. The method of claim 4, wherein said surface modifying macromolecule comprises one or more surfactants, Zwitterionic compound, fluorinated polyurethane, or any combinations thereof.

6. The method of claim 1, wherein said at least one polymer comprises at least one hydrophobic polymer and at least one hydrophilic polymer in a solvent comprising at least one polar aprotic solvent.

7. The method of claim 6, wherein said solution comprises from 10 wt % to about 30 wt % of the at least one hydrophobic polymer, from about 2 wt % to about 30 wt % of the at least one hydrophilic polymer, and from about 60 wt % to about 90 wt % of the at least one polar aprotic solvent.

8. The method of claim 1, wherein said sonication of said solution occurs in said spinning block and/or said sonication of said polymeric membrane occurs in said spinning block.

9. The method of claim 1, further comprising sonicating said precipitation bath.

10. The method of claim 1, further comprising sonicating said washing bath.

11. The method of claim 1, further comprising sonicating said polymeric membrane between said washing bath and said drying chamber.

12. The method of claim 1, wherein said sonication is conducted at an oscillation frequency of at least 20 kHz and wherein said sonication is conducted at a power rating of at least 25 watts.

13. The method of claim 1, wherein said sonication of said solution in said spinning block is conducted and during said forming, and said sonication causes mixing on a microscopic level of said at least one hydrophobic polymer and said at least one hydrophilic polymer.

14. The method of claim 8, wherein said forming occurs in said spinning block, and wherein said sonication further comprises sonicating said solution prior to the solution entering the spinning block.

15. The method of claim 1, wherein said sonication occurs in said at least one drying chamber, wherein said sonication prevents or reduces fiber membrane collapsing during drying of the polymeric membrane.

16. The method of claim 1, wherein said sonication reduces undesirable accumulation of material on the spinning block and/or spinning equipment other than said spinning block.

17. The method of claim 8, wherein two or three or more sonicators are mounted at various locations on the spinning block so as to ensure that the solution passing through the spinning block and/or the polymeric hollow fiber membrane formed in the spinning block is sonicated.

18. The method of claim 1, wherein said sonication of said solution occurs in said spinning block.

19. The method of claim 1, wherein said sonication of said polymeric membrane occurs in said spinning block.

* * * * *